(12) United States Patent
Di et al.

(10) Patent No.: US 10,459,572 B2
(45) Date of Patent: Oct. 29, 2019

(54) TOUCHSCREEN INTERFERENCE SUPPRESSION METHOD AND APPARATUS, AND TERMINAL DEVICE

(71) Applicant: Huawei Device Co., Ltd., Dongguan (CN)

(72) Inventors: Wei Di, Shanghai (CN); Jie Zou, Shenzhen (CN); Yang Yang, Shenzhen (CN); Tianpeng Wang, Shanghai (CN)

(73) Assignee: Huawei Device Co., Ltd., Dongguan (CN)

( * ) Notice: Subject to any disclaimer, the term of this patent is extended or adjusted under 35 U.S.C. 154(b) by 142 days.

(21) Appl. No.: 15/113,965

(22) PCT Filed: Jan. 26, 2014

(86) PCT No.: PCT/CN2014/071470
§ 371 (c)(1),
(2) Date: Jul. 25, 2016

(87) PCT Pub. No.: WO2015/109562
PCT Pub. Date: Jul. 30, 2015

(65) Prior Publication Data
US 2016/0349920 A1 Dec. 1, 2016

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ............................... G06F 3/0418; G06F 3/044
See application file for complete search history.

(56) References Cited

U.S. PATENT DOCUMENTS

| | | | |
|---|---|---|---|
| 2007/0109274 A1* | 5/2007 | Reynolds | G06F 3/041 345/173 |
| 2008/0040079 A1 | 2/2008 | Hargreaves | |
| 2008/0262732 A1* | 10/2008 | Davis | G01W 1/16 702/4 |
| 2009/0122024 A1 | 5/2009 | Nakamura et al. | |
| 2011/0063229 A1 | 3/2011 | Krah et al. | |
| 2011/0285654 A1 | 11/2011 | Park et al. | |

(Continued)

FOREIGN PATENT DOCUMENTS

| | | |
|---|---|---|
| CN | 101080689 A | 11/2007 |
| CN | 102841715 A | 12/2012 |

(Continued)

OTHER PUBLICATIONS

Tang, J. et al., "Suppression of the Random Narrow-band Noise with Mixed Frequencies in Partial Discharge with the Optimal Harmonic Wavelet Packet Transform," Proceedings of the CSEE, vol. 33 No. 31, Nov. 5, 2013, 9 pages.

(Continued)

*Primary Examiner* — Ram A Mistry
(74) *Attorney, Agent, or Firm* — Slater Matsil, LLP

(57) ABSTRACT

This application provides a touchscreen interference suppression method and apparatus, and a terminal device. In the method, when a touchscreen is in an untouched state, whether a wideband interference signal exists in the touchscreen is detected; and when the wideband interference signal exists, a detection bandwidth of a filter unit is reduced.

21 Claims, 7 Drawing Sheets

(56) References Cited

U.S. PATENT DOCUMENTS

| | | | |
|---|---|---|---|
| 2012/0200524 A1 | 8/2012 | Vallis et al. | |
| 2012/0217978 A1* | 8/2012 | Shen | G06F 3/0418 324/601 |
| 2013/0106759 A1 | 5/2013 | Fredriksen et al. | |
| 2013/0271398 A1 | 10/2013 | Chuang et al. | |
| 2014/0015768 A1 | 1/2014 | Karpin et al. | |
| 2014/0078099 A1 | 3/2014 | Mo et al. | |
| 2014/0078101 A1* | 3/2014 | Katsurahira | G06F 3/044 345/174 |
| 2014/0168145 A1 | 6/2014 | Reynolds | |
| 2016/0092028 A1 | 3/2016 | Vallis et al. | |

FOREIGN PATENT DOCUMENTS

| | | |
|---|---|---|
| CN | 102880347 A | 1/2013 |
| CN | 102934061 A | 2/2013 |
| CN | 103309529 A | 9/2013 |
| CN | 103376937 A | 10/2013 |
| CN | 103516441 A | 1/2014 |
| EP | 0526007 A2 | 7/1992 |
| EP | 0789317 A1 | 8/1997 |
| JP | H09311752 A | 12/1997 |
| JP | H1124830 A | 1/1999 |
| JP | 2009516295 | 4/2009 |
| JP | 2009134691 A | 6/2009 |
| JP | 2010015262 A | 1/2010 |
| WO | 2014011203 A1 | 1/2014 |

OTHER PUBLICATIONS

Xie, J.-C. et al., "Overview on Wavelet Image Denoising," Journal of Image and Graphics, vol. 7 (A), No. 3, Mar. 2002, 9 pages.

* cited by examiner

TOUCHSCREEN INTERFERENCE SUPPRESSION METHOD AND APPARATUS, AND TERMINAL DEVICE

This patent application is a national phase filing under section 371 of PCT/CN2014/071470, filed on Jan. 26, 2014, which is incorporated herein by reference in its entirety.

TECHNICAL FIELD

The present invention relates to the field of touchscreen technologies, and in particular, to a touchscreen interference suppression method and apparatus, and a terminal device.

BACKGROUND

With development of touchscreen technologies, a touchscreen becomes increasingly sensitive. A more sensitive touchscreen indicates more significant impact of a noise signal on the touchscreen, and therefore, a higher requirement for interference immunity of the touchscreen.

In an existing touchscreen anti-interference solution, for a noise signal, a frequency hopping manner or a manner of increasing a touch decision threshold is generally used to reduce impact of an interference signal on a touchscreen. The two anti-interference manners are specifically as follows.

In the frequency hopping manner, a group of operating frequencies of the touchscreen is generally preset. When the touchscreen is operating, whether an interference signal exists on a current operating frequency is detected. If the interference signal exists, the operating frequency of the touchscreen is adjusted to another preset frequency. However, when the interference signal exists in an entire operating frequency band of the touchscreen, that is, a wideband interference signal exists, no matter which frequency is hopped to, the touchscreen operates in an interference environment, that is, the wideband interference signal cannot be suppressed.

In the manner of increasing the touch decision threshold, the touch decision threshold is generally increased, and consequently, an interference signal cannot trigger a touch action on the touchscreen. However, this anti-interference manner reduces touch sensitivity, and may dramatically reduce sensitivity of a touch function of a stylus or a glove, and even cause a phenomenon of a failure of the stylus or the touch glove.

In summary, the existing touchscreen anti-interference manners cannot effectively suppress a wideband interference signal.

SUMMARY

Embodiments of the present invention provide a touchscreen interference suppression method and apparatus, and a terminal device, to resolve a problem that a wideband interference signal is poorly suppressed in an existing touchscreen anti-interference solution.

To resolve the foregoing technical problem, the embodiments of the present invention disclose the following technical solutions.

According to a first aspect, an embodiment of the present invention provides a touchscreen interference suppression method. The method includes: detecting, when a touchscreen is in an untouched state, whether a wideband interference signal exists in a received signal on a receive electrode of the touchscreen. The method also includes, when the wideband interference signal exists in the received signal on the receive electrode, reducing a detection bandwidth of a band-pass filter from a first detection bandwidth to a second detection bandwidth.

With reference to the first aspect, in a first possible implementation manner of the first aspect, the detecting, when the touchscreen is in the untouched state, whether the wideband interference signal exists in the received signal on the receive electrode of the touchscreen includes: detecting, when the touchscreen is in the untouched state, whether an interference signal exists in the received signal on a current operating frequency of the touchscreen; and when it is detected that the interference signal exists in the received signal on the current operating frequency, detecting whether the interference signal exists in the received signal on a next preset operating frequency of the touchscreen; and when it is detected that the interference signal exists in the received signal on all preset operating frequencies of the touchscreen, determining that the wideband interference signal exists in the received signal on the receive electrode of the touchscreen.

With reference to the first possible implementation manner of the first aspect, in a second possible implementation manner of the first aspect, the method further includes: when it is detected that the interference signal exists in the received signal on some preset operating frequencies of the touchscreen, determining that a narrowband interference signal exists in the received signal on the receive electrode; and adjusting the current operating frequency of the touchscreen to a preset operating frequency on which the interference signal does not exist.

With reference to the first possible implementation manner of the first aspect, in a third possible implementation manner of the first aspect, the detecting, when the touchscreen is in the untouched state, whether the interference signal exists in the received signal on the current operating frequency of the touchscreen includes: detecting whether a fluctuation amplitude of the received signal on the receive electrode of the touchscreen is less than a touch threshold determining value; when it is detected that the fluctuation amplitude of the received signal is less than the touch threshold determining value, determining that the touchscreen is in the untouched state; detecting whether the fluctuation amplitude of the received signal on the receive electrode on the current operating frequency of the touchscreen is not less than a first threshold; and when it is detected that the fluctuation amplitude of the received signal is not less than the first threshold, determining that the interference signal exists in the received signal on the receive electrode on the current operating frequency of the touchscreen.

With reference to the first possible implementation manner of the first aspect, in a fourth possible implementation manner of the first aspect, the detecting, when the touchscreen is in the untouched state, whether the interference signal exists in the received signal on the current operating frequency of the touchscreen includes: detecting whether a fluctuation amplitude of the received signal on the receive electrode on the current operating frequency of the touchscreen is less than a touch threshold determining value; when it is detected that the fluctuation amplitude of the received signal is not less than the touch threshold determining value, determining whether a quantity of areas, on the touchscreen, in which the fluctuation amplitude of the received signal is not less than the touch threshold determining value exceeds a preset quantity; and when the quantity of areas, on the touchscreen, in which the fluctuation amplitude of the received signal is not less than the touch threshold determining value exceeds the preset quantity, determining that the interference signal exists in the received signal.

According to a second aspect, an embodiment of the present invention provides a touchscreen interference suppression apparatus. The apparatus includes: an interference-signal detection unit, configured to: when a touchscreen is in an untouched state, detect whether a wideband interference signal exists in a received signal on a receive electrode of the touchscreen. The apparatus also includes a detection-bandwidth adjustment unit, configured to: when the wideband interference signal exists in the received signal on the receive electrode, reduce a detection bandwidth of a band-pass filter from a first detection bandwidth to a second detection bandwidth.

With reference to the second aspect, in a first possible implementation manner of the second aspect, the interference-signal detection unit includes: a first interference-signal detection unit, configured to: when the touchscreen is in the untouched state, detect whether an interference signal exists in the received signal on a current operating frequency of the touchscreen; a second interference-signal detection unit, configured to: when it is detected that the interference signal exists in the received signal on the current operating frequency, detect whether the interference signal exists in the received signal on a next preset operating frequency of the touchscreen; and a first determining unit, configured to: when it is detected that the interference signal exists in the received signal on all preset operating frequencies of the touchscreen, determine that the wideband interference signal exists in the received signal on the receive electrode of the touchscreen.

With reference to the first possible implementation manner of the second aspect, in a second possible implementation manner of the second aspect, the apparatus further includes: a second determining unit, configured to: when it is detected that the interference signal exists in the received signal of some preset operating frequencies of the touchscreen, determine that a narrowband interference signal exists in the received signal on the receive electrode. The apparatus also includes a frequency adjustment unit, configured to: when it is detected that the narrowband interference signal exists in the received signal on the receive electrode, adjust the current operating frequency of the touchscreen to a preset operating frequency on which the interference signal does not exist.

With reference to the first possible implementation manner of the second aspect, in a third possible implementation manner of the second aspect, the first interference-signal detection unit includes: a touchscreen status detection unit, configured to detect whether a fluctuation amplitude of the received signal on the receive electrode of the touchscreen is less than a touch threshold determining value; an interference-signal detection subunit, configured to: when it is detected that the fluctuation amplitude of the received signal is less than the touch threshold determining value, detect whether the fluctuation amplitude of the received signal on the current operating frequency of the touchscreen is not less than a first threshold; and a first determining subunit, configured to: when it is detected that the fluctuation amplitude of the received signal is not less than the first threshold, determine that the interference signal exists at the current operating frequency.

With reference to the first possible implementation manner of the second aspect, in a fourth possible implementation manner of the second aspect, the first interference-signal detection unit includes: a touchscreen status detection unit, configured to: when the touchscreen is in the untouched state, detect, on the current operating frequency of the touchscreen, whether a fluctuation amplitude of the received signal on the receive electrode of the touchscreen is less than a touch threshold determining value; a first judging unit, configured to: when it is detected that the fluctuation amplitude of the received signal is not less than the touch threshold determining value, determine whether a quantity of areas, on the touchscreen, in which the fluctuation amplitude of the received signal is not less than the touch threshold determining value exceeds a preset quantity; and a second determining subunit, configured to: when the quantity of areas, on the touchscreen, in which the fluctuation amplitude of the received signal is not less than the touch threshold determining value exceeds the preset quantity, determine that the interference signal exists in the received signal.

According to a third aspect, an embodiment of the present invention provides a terminal device, including a touchscreen, a pulse generation circuit, an amplifier, an analog-to-digital converter, and a processor, where an output end of the pulse generation circuit is connected to a drive electrode of the touchscreen, an input end of the amplifier is connected to a receive electrode of the touchscreen, an input end of the analog-to-digital converter is connected to an output end of the amplifier, and an output end of the analog-to-digital converter is connected to the processor. The pulse generation circuit is configured to generate a pulse signal required for the touchscreen to operate, and send out the pulse signal by using the drive electrode of the touchscreen. The receive electrode of the touchscreen is configured to receive a received signal, where the received signal includes the pulse signal. The amplifier is configured to amplify the received signal. The analog-to-digital converter is configured to perform analog-to-digital conversion on the received signal. The processor is configured to: when the touchscreen is in an untouched state, detect whether a wideband interference signal exists in the received signal on the receive electrode; and when the wideband interference signal exists in the received signal on the receive electrode, reduce a detection bandwidth of a band-pass filter from a first detection bandwidth to a second detection bandwidth.

With reference to the third aspect, in a first possible implementation manner of the third aspect, the pulse generation circuit, the amplifier, the analog-to-digital converter, and the processor are integrated in one chip.

With reference to the third aspect or the first possible implementation manner of the third aspect, in a second possible implementation manner of the third aspect, the processor is a CPU or a controller.

With reference to the third aspect, in a third possible implementation manner of the third aspect, that the processor is configured to: when the touchscreen is in the untouched state, detect whether the wideband interference signal exists in the received signal on the receive electrode includes: the processor is configured to: when the touchscreen is in the untouched state, detect whether an interference signal exists in the received signal on a current operating frequency of the touchscreen; and when it is detected that the interference signal exists in the received signal on the current operating frequency, detect whether the interference signal exists in the received signal on a next preset operating frequency of the touchscreen; and until when it is detected that the interference signal exists in the received signal on all preset operating frequencies of the touchscreen, determine that the wideband interference signal exists in the received signal on the receive electrode of the touchscreen.

With reference to the third possible implementation manner of the third aspect, in a fourth possible implementation manner of the third aspect, that the processor is configured to: when the touchscreen is in the untouched state, detect whether the interference signal exists in the received signal on the current operating frequency of the touchscreen includes: when the touchscreen is in the untouched state, detect, on the current operating frequency of the touchscreen, whether a fluctuation amplitude of the received signal on the receive electrode of the touchscreen is less than a touch threshold determining value; when it is detected that the fluctuation amplitude of the received signal is not less than the touch threshold determining value, determine whether a quantity of areas, on the touchscreen, in which the fluctuation amplitude of the received signal is not less than the touch threshold determining value exceeds a preset quantity; and when the quantity of areas, on the touchscreen, in which the fluctuation amplitude of the received signal is not less than the touch threshold determining value exceeds the preset quantity, determine that the interference signal exists in the received signal.

With reference to the third aspect and any one of the first possible implementation manner of the third aspect to the fourth possible implementation manner of the third aspect, in a fifth possible implementation manner of the third aspect, the terminal device is a mobile phone with a touchscreen or a tablet.

According to a fourth aspect, an embodiment of the present invention provides a computer-readable storage medium, where the computer-readable storage medium stores program code that can be executed by a processor, and the program code enables the processor to perform the following operations: when a touchscreen is in an untouched state, detect whether a wideband interference signal exists in a received signal on a receive electrode of the touchscreen; and when the wideband interference signal exists in the received signal on the receive electrode, reduce a detection bandwidth of a band-pass filter from a first detection bandwidth to a second detection bandwidth.

According to the touchscreen interference suppression method provided in embodiments of the present invention, when a touchscreen is in an untouched state, whether a wideband interference signal exists in the touchscreen is detected; and when the wideband interference signal exists, a detection bandwidth of a filter unit is reduced, where a wideband interference signal strength captured by using a smaller detection bandwidth is relatively low, which can reduce impact of the wideband interference signal on a touch sampling signal, and improve interference immunity of the touchscreen being untouched.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, a person of ordinary skill in the art may still derive other drawings from these accompanying drawings without creative efforts.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

DETAILED DESCRIPTION OF ILLUSTRATIVE EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
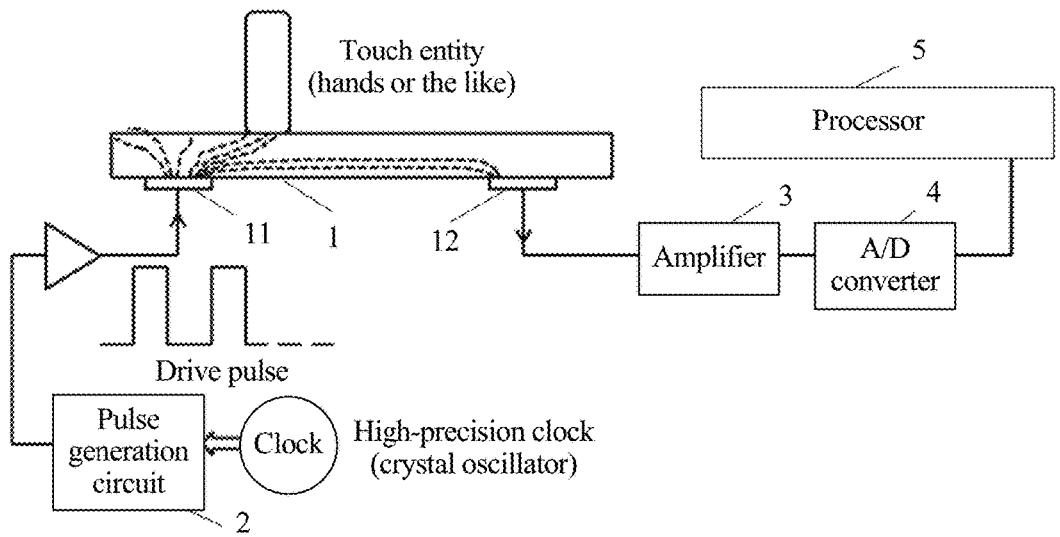
FIG. 1 is a schematic diagram of a terminal device according to an embodiment of the present invention.

FIG. 1 shows a schematic diagram of a terminal device according to an embodiment of the present invention. As shown in FIG. 1, the terminal device includes a touchscreen 1, a pulse generation circuit 2, an amplifier 3, an A/D converter (analog-to-digital converter) 4, and a processor 5. The touchscreen 1 includes a drive electrode 11 and a receive electrode 12. The touchscreen 1 shown in FIG. 1 may be a mutual capacitance touchscreen. Alternatively, the touchscreen 1 may be a self-capacitance touchscreen, a touchscreen combining mutual capacitance and self-capacitance, or the like.

An output end of the pulse generation circuit 2 is connected to the drive electrode 11 of the touchscreen 1. An input end of the amplifier 3 is connected to the receive electrode 12 of the touchscreen 1. An input end of the A/D converter 4 is connected to an output end of the amplifier 3. An output end of the A/D converter 4 is connected to the processor 5. A pulse signal of the pulse generation circuit 2 may be generated by using a high-precision clock signal.

The pulse generation circuit 2 is configured to generate a pulse signal required for the touchscreen 1 to operate, and send out the pulse signal by using the drive electrode 11 of the touchscreen 1. The receive electrode 12 is configured to obtain a received signal. When the touchscreen 1 is in an interference environment, the received signal on the receive electrode 12 includes an interference signal and the received pulse signal sent by the drive electrode 11. When no interference signal exists in the touchscreen, the received signal on the receive electrode 12 includes the pulse signal sent by the drive electrode 11.

The amplifier 3 is configured to amplify the received signal on the receive electrode 12. The A/D converter 4 is configured to perform analog-to-digital conversion on the amplified received signal, to obtain a corresponding digital signal.

The processor 5 is configured to: when the touchscreen 1 is in an untouched state, detect whether a wideband interference signal exists in the received digital signal; and when the wideband interference signal exists, reduce a detection bandwidth of a band-pass filter (not shown in the figure) from a first detection bandwidth to a second detection bandwidth.

The detection bandwidth represents a minimum difference between bandwidths at which two signals of different frequencies can be clearly distinguished. If bandwidths of two signals of different frequencies are lower than the detection bandwidth, the two signals of different frequencies are overlapped and are hard to be distinguished. The first detection bandwidth may be a default detection bandwidth of the band-pass filter. The second detection bandwidth may be determined according to a current operating frequency of the touchscreen and a frequency range of the detected wideband interference signal.

Preferably, when it is detected that the wideband interference signal exists in the touchscreen, an operating frequency of the touchscreen may be adjusted to a preset operating frequency on which an interference signal is weakest; and the second detection bandwidth is determined according to the preset operating frequency obtained after the adjustment and a frequency of the interference signal.

The band-pass filter performs band-pass filtering on the digital signal obtained by the A/D converter 4. The band-pass filter may be implemented by using a digital band-pass filter, such as a Butterworth filter. An adjustment manner of the detection bandwidth may be any possible manner for implementing detection bandwidth adjustment, for example, a construction manner based on a linear time-invariant system and a variable bandwidth frequency characteristic.

In an embodiment of the present invention, the processor 5 is configured to detect whether an interference signal exists in the received signal on a current operating frequency of the touchscreen when the touchscreen is in the untouched state. When it is detected that the interference signal exists in the received signal on the current operating frequency, the processor 5 is configured to detect whether the interference signal exists in the received signal on a next preset operating frequency of the touchscreen. Until when it is detected that the interference signal exists in the received signal on all preset operating frequencies of the touchscreen, the processor 5 is configured to determine that the wideband interference signal exists in the received signal on the receive electrode of the touchscreen.

Optionally, when it is detected that the interference signal exists in the received signal on the current operating frequency of the touchscreen, it indicates that the touchscreen is in the interference environment; whether the interference signal exists on other preset operating frequencies of the touchscreen is further detected. If the interference signal exists in all preset operating frequencies of the touchscreen, the wideband interference signal exists in the touchscreen.

The interference signal of the touchscreen is generally generated by a component close to the touchscreen (for example, a display under a touch layer, a power supply of a smart phone, a charging power supply, or the like).

Optionally, when the interference signal exists in the received signal on some preset operating frequencies of the touchscreen, it indicates that the interference signal is a narrowband interference signal. In this case, the operating frequency of the touchscreen is adjusted to a preset operating frequency on which the interference signal does not exist; the received signal on the preset operating frequency of the touchscreen after the adjustment is filtered by using the default first detection bandwidth of the band-pass filter.

It should be noted that when it is detected that the interference signal does not exist in the received signal on a preset operating frequency of the touchscreen, detecting whether the interference signal exists in the received signal on other undetected preset operating frequencies may be no longer needed. In this case, the operating frequency of the touchscreen may be adjusted to the preset operating frequency on which the interference signal does not exist, and time used for detecting the interference signal can be reduced.

Optionally, the pulse generation circuit 2, the amplifier 3, the A/D converter 4, and the processor 5 may be integrated in one chip, which can reduce a volume of a control circuit of the touchscreen.

The processor 5 may be a CPU or a controller.

According to the touchscreen provided in this embodiment, when the touchscreen is in an untouched state and it is detected that a wideband interference signal exists in the touchscreen, a detection bandwidth of a band-pass filter of the touchscreen may be reduced, which can reduce impact of the wideband interference signal on a touch sampling signal, and improve interference immunity of the touchscreen being untouched. In addition, a detection bandwidth of the band-pass filter of the touchscreen is reduced to reduce the impact of the wideband interference signal on the touch sampling signal. This manner does not require an increase in a touch threshold determining value, which can ensure touch sensitivity of the touchscreen and can suppress the wideband interference signal.

The present invention further provides an embodiment of a touchscreen interference suppression method.

Figure 2:
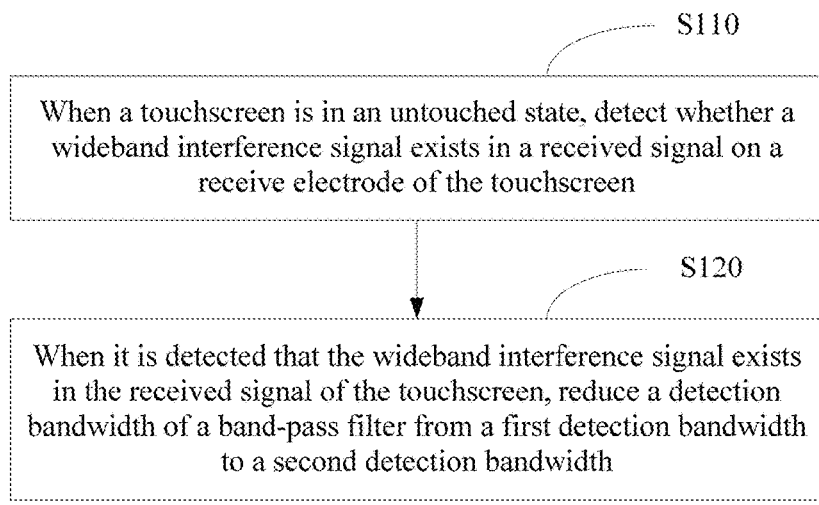
FIG. 2 is a schematic flowchart of a touchscreen interference suppression method according to an embodiment of the present invention.

FIG. 2 shows a schematic flowchart of a touchscreen interference suppression method according to this embodiment of the present invention. The method may be applied to a device with a touchscreen, such as a capacitive touchscreen mobile phone. A capacitive touchscreen may be a self-capacitance touchscreen, a mutual capacitance touchscreen, a touchscreen combining mutual capacitance and self-capacitance, or the like.

The method includes the following steps.

S110. When the touchscreen is in an untouched state, detect whether a wideband interference signal exists in a received signal on a receive electrode of the touchscreen; if the wideband interference signal exists, perform step S120.

Figure 3:
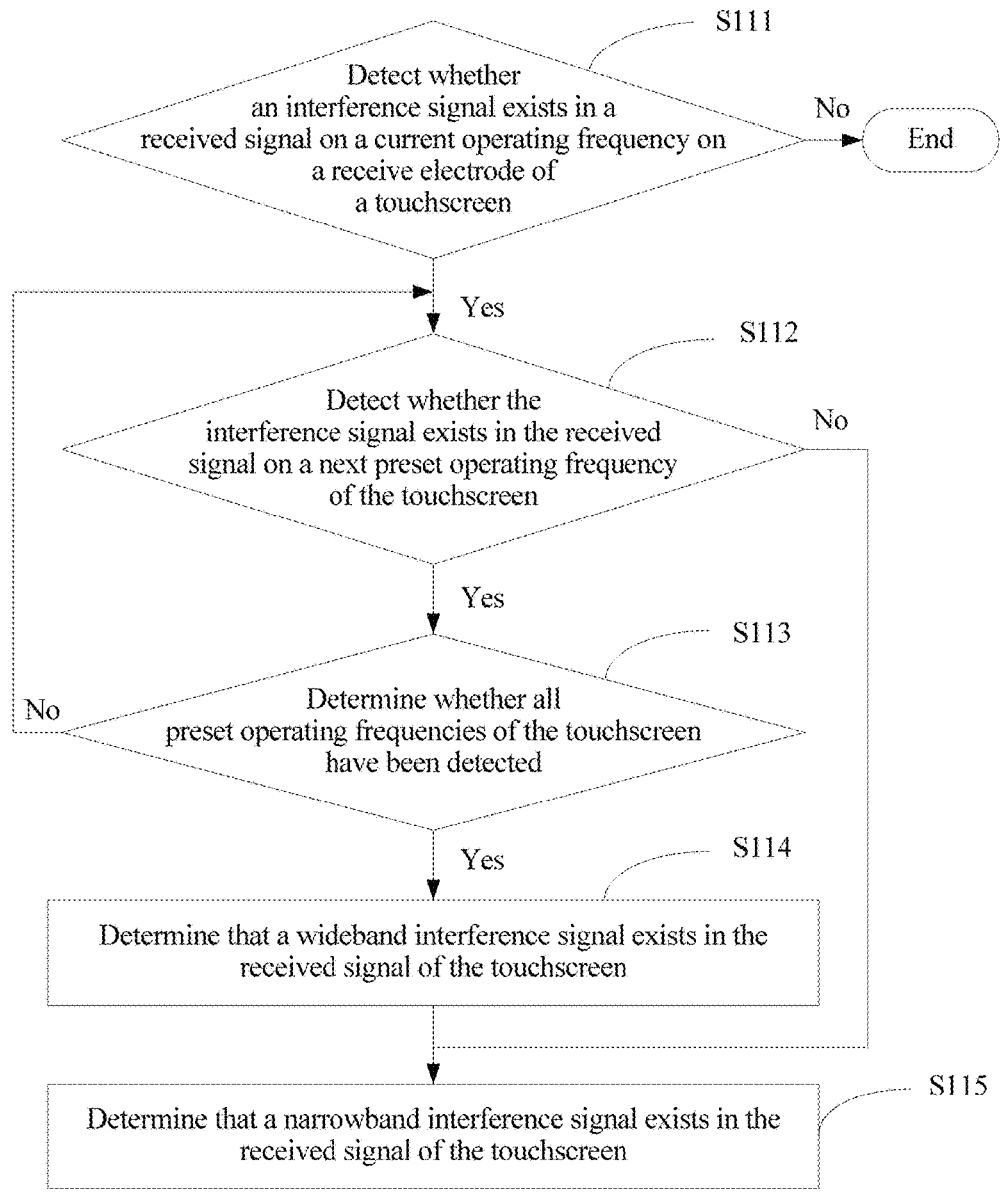
FIG. 3 is a schematic flowchart of step S110 in FIG. 2.

In an embodiment of the present invention, as shown in FIG. 3, step S110 may be implemented by using the following steps.

When the touchscreen is in the untouched state, in step S111, detect whether an interference signal exists in the received signal on a current operating frequency on the receive electrode of the touchscreen; if the interference signal exists, perform step S112; otherwise, end.

When it is detected that the interference signal exists in the received signal on the current operating frequency of the touchscreen, in step S112, detect whether the interference signal exists in the received signal on a next preset operating frequency of the touchscreen; if the interference signal exists in the received signal on the next preset operating frequency, perform step S113; otherwise, perform step S115.

S113. Determine whether all preset operating frequencies of the touchscreen have been detected; if yes, perform step S114; otherwise, go back to step S112.

When the interference signal exists in all preset operating frequencies of the touchscreen, in step S114, determine that the wideband interference signal exists in the received signal of the touchscreen.

When the interference signal exists in some preset operating frequencies of the touchscreen, in step S115, determine that a narrowband interference signal exists in the received signal of the touchscreen.

Optionally, when it is detected that the narrowband interference signal exists in the received signal of the touchscreen, an operating frequency of the touchscreen is adjusted to a preset operating frequency on which the interference signal does not exist. In this case, a detection bandwidth of a band-pass filter may not be adjusted, and a first detection bandwidth is still used to perform filtering.

S120. When it is detected that the wideband interference signal exists in the received signal of the touchscreen, reduce a detection bandwidth of the band-pass filter from a first detection bandwidth to a second detection bandwidth. The first detection bandwidth may be a default detection bandwidth of the band-pass filter.

After the detection bandwidth of the band-pass filter is adjusted, in a process of touch detection on the touchscreen at a next moment, the received signal on the receive electrode of the touchscreen is filtered by using the second detection bandwidth, and a touch threshold is determined, to determine whether a touch action exists in the received signal at the next moment.

FIG. 4, FIG. 5, FIG. 6, and FIG. 7 can be referred to see a result of decreasing interference by reducing a detection bandwidth according to this embodiment of the present invention.

Figure 4:
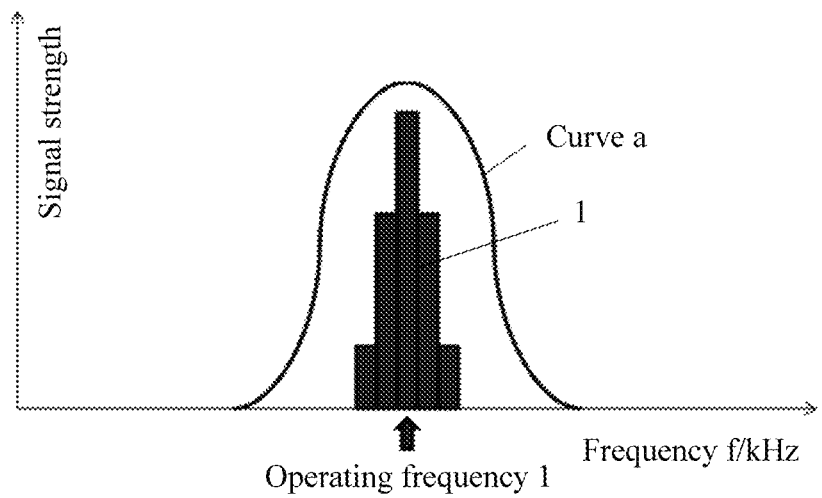
FIG. 4 is a schematic diagram of a touch signal strength when a touchscreen is in an environment without an interference signal.
Figure 5:
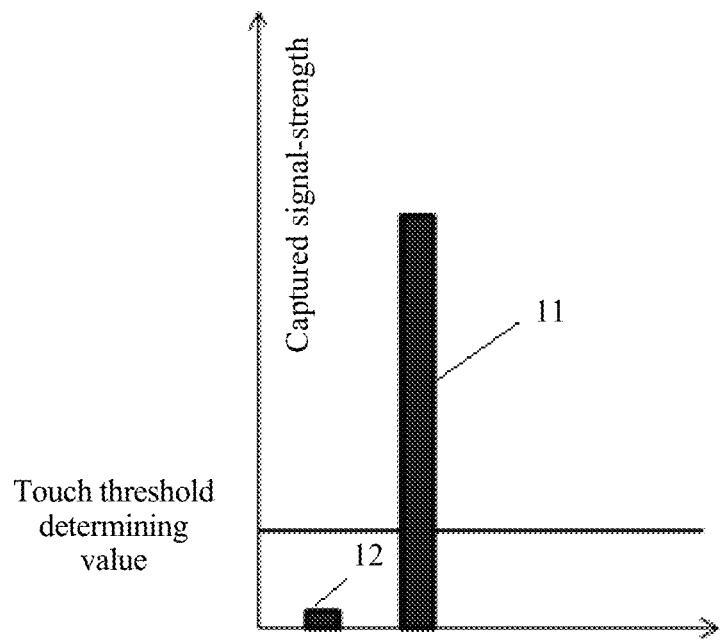
FIG. 5 is a schematic diagram of a captured signal-strength of the signal shown in FIG. 4.
Figure 6:
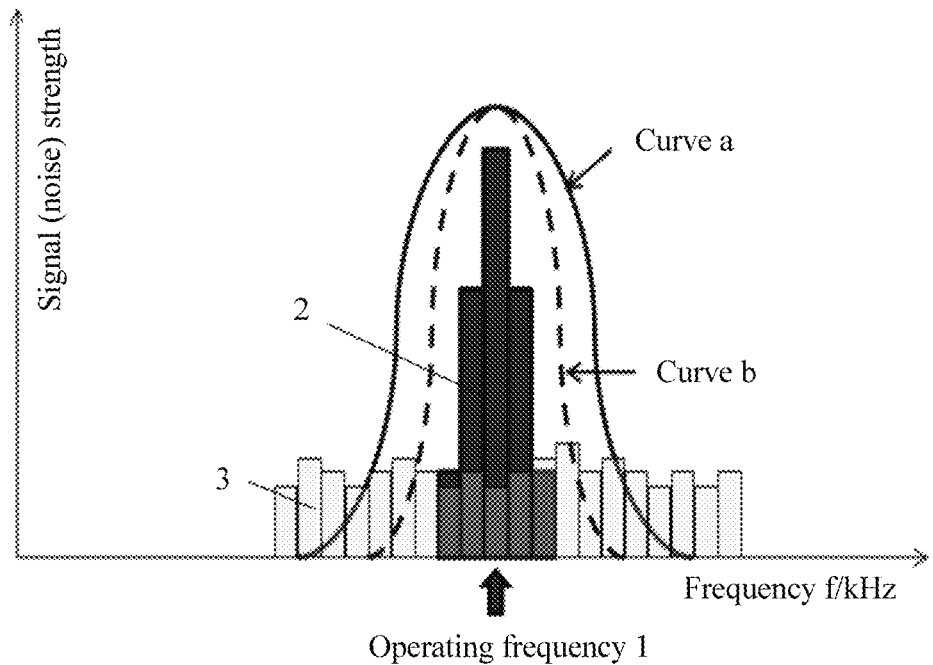
FIG. 6 is a schematic diagram of a signal strength when a touchscreen is in an environment with a wideband interference signal.
Figure 7:
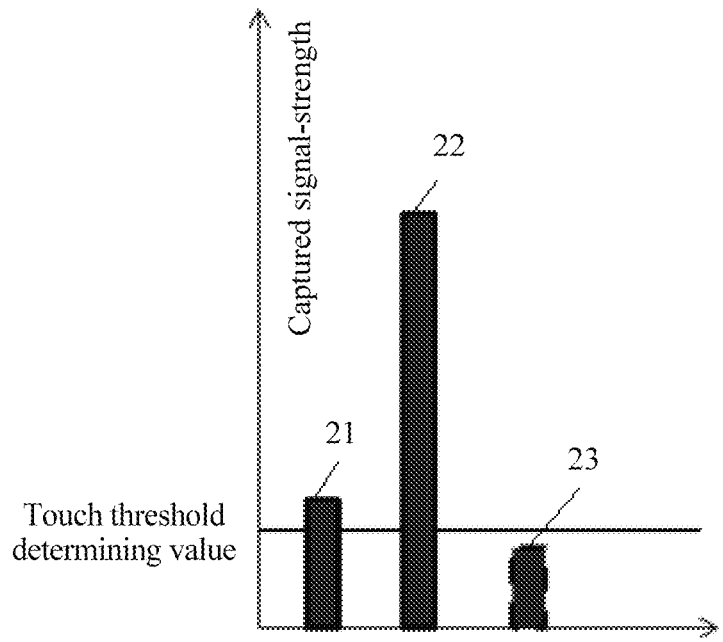
FIG. 7 is a schematic diagram of a captured signal-strength of the signal shown in FIG. 6.

FIG. 4 is a schematic diagram of a touch signal strength when the touchscreen is in an environment without an interference signal. FIG. 5 is a schematic diagram of a signal strength captured by using a first detection bandwidth in FIG. 4. FIG. 6 is a schematic diagram of a signal when the touchscreen is in a wideband interference environment. FIG. 7 is a schematic diagram of a signal strength after band-pass filtering is performed in FIG. 6.

As shown in FIG. 4 and FIG. 6, a vertical axis represents a signal strength, and a horizontal axis represents a frequency. As shown in FIG. 4, a touch signal 1 is detected at an operating frequency 1. After the touch signal 1 is filtered by using the first detection bandwidth shown in a curve a in FIG. 4, the schematic diagram of a captured signal-strength shown in FIG. 5 is obtained. In FIG. 5, a bar 11 represents the captured signal-strength corresponding to the touch signal shown in FIG. 4. A bar 12 represents a captured signal-strength when the touchscreen is untouched. It can be learned from FIG. 5 that the captured signal-strength of the touch signal is far greater than a touch threshold determining value, and the captured signal-strength when no touch exists is less than the touch threshold determining value.

In FIG. 6, a touch signal 2 is detected at the operating frequency 1. An interference signal 3 exists in a frequency band of the operating frequency 1. A curve a in the figure represents a band-pass filtering curve of a first detection bandwidth. A curve b represents a band-pass filtering curve of a second detection bandwidth. In FIG. 7, a bar 21 represents a captured signal-strength after filtering is performed by using the first detection bandwidth when the touchscreen is untouched. A bar 22 represents a captured signal-strength after the touch signal 2 is filtered by using the second detection bandwidth. A bar 23 represents a captured signal-strength after filtering is performed by using the second detection bandwidth when the touchscreen is untouched.

It can be learned by comparing the bar 21 and the bar 23 that the signal strength of the bar 21 is greater than the touch threshold determining value, and the signal strength of the bar 23 is less than the touch threshold determining value, that is, the interference signal may not be falsely determined as a touch signal. It can be learned from above that a received signal is filtered by using the second detection bandwidth, which can effectively reduce a signal strength of an interference signal, and improve interference immunity of the touchscreen being in the untouched state.

Figure 8:
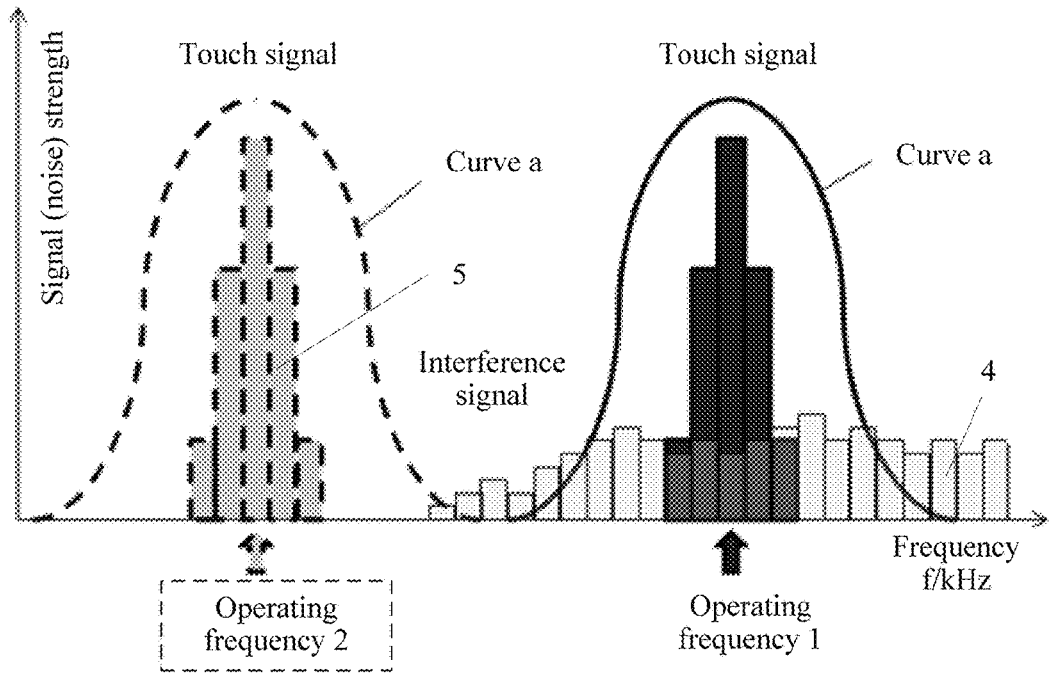
FIG. 8 is a schematic diagram of a signal strength when a touchscreen is in an environment with a narrowband interference signal.
Figure 9:
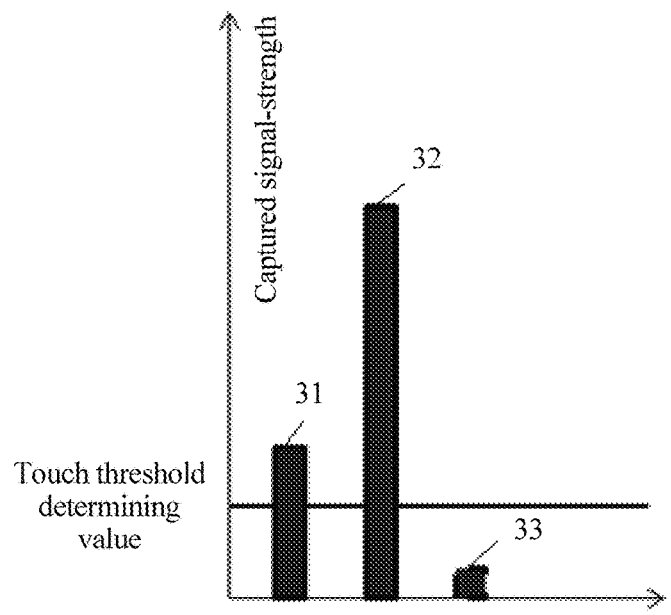
FIG. 9 is a schematic diagram of a captured signal-strength of the signal shown in FIG. 8 during frequency hopping.

FIG. 8 and FIG. 9 can be referred to explain a result of reducing interference during frequency hopping. FIG. 8 is a schematic diagram of a signal strength when a touchscreen is in an environment with a narrowband interference signal. FIG. 9 is a schematic diagram of a signal strength captured by a filter during frequency hopping.

As shown in FIG. 8, a narrowband interference signal 4 is detected at the operating frequency 1. In this case, when the touchscreen is untouched, a captured signal-strength shown in a bar 31 in FIG. 9 is obtained after the narrowband interference signal 4 is filtered by using a first detection bandwidth (as shown in a curve a). The signal strength of the bar 31 is greater than the touch threshold determining value, and consequently, the touchscreen falsely determines the narrowband interference signal 4 as a normal touch signal.

According to the touchscreen interference suppression method provided in this embodiment of the present invention, when it is detected that the interference signal is the narrowband interference signal, the operating frequency of the touchscreen is switched to the operating frequency 2 at which the narrowband interference signal 4 does not exist. In this case, when the touchscreen is untouched, after the received signal on the receive electrode is filtered by using the first detection bandwidth (as shown in the curve a), a captured signal-strength shown in a bar 33 in FIG. 9 is obtained, where the signal strength of the bar 33 is less than the touch threshold determining value, and interference immunity of the touchscreen being untouched is improved.

A bar 32 in FIG. 9 represents a captured signal-strength after the touch signal 5 is filtered by using the first detection bandwidth, where the signal strength is far greater than the touch threshold determining value.

According to the touchscreen interference suppression method provided in this embodiment, when a touchscreen is in an untouched state, whether an interference signal exists in the touchscreen is determined; when the interference signal exists, whether the interference signal is a wideband interference signal is determined; if the interference signal is the wideband interference signal, a detection bandwidth of a band-pass filter is reduced, and a wideband interference signal strength captured by using a smaller detection bandwidth is relatively low, so as to reduce impact of the wideband interference signal on a touch sampling signal, and improve interference immunity of the touchscreen being untouched. In addition, in the touchscreen interference suppression method provided in this embodiment, there is no need to improve a touch threshold determining value, which can ensure touch sensitivity of the touchscreen and can suppress the wideband interference signal.

Figure 10:
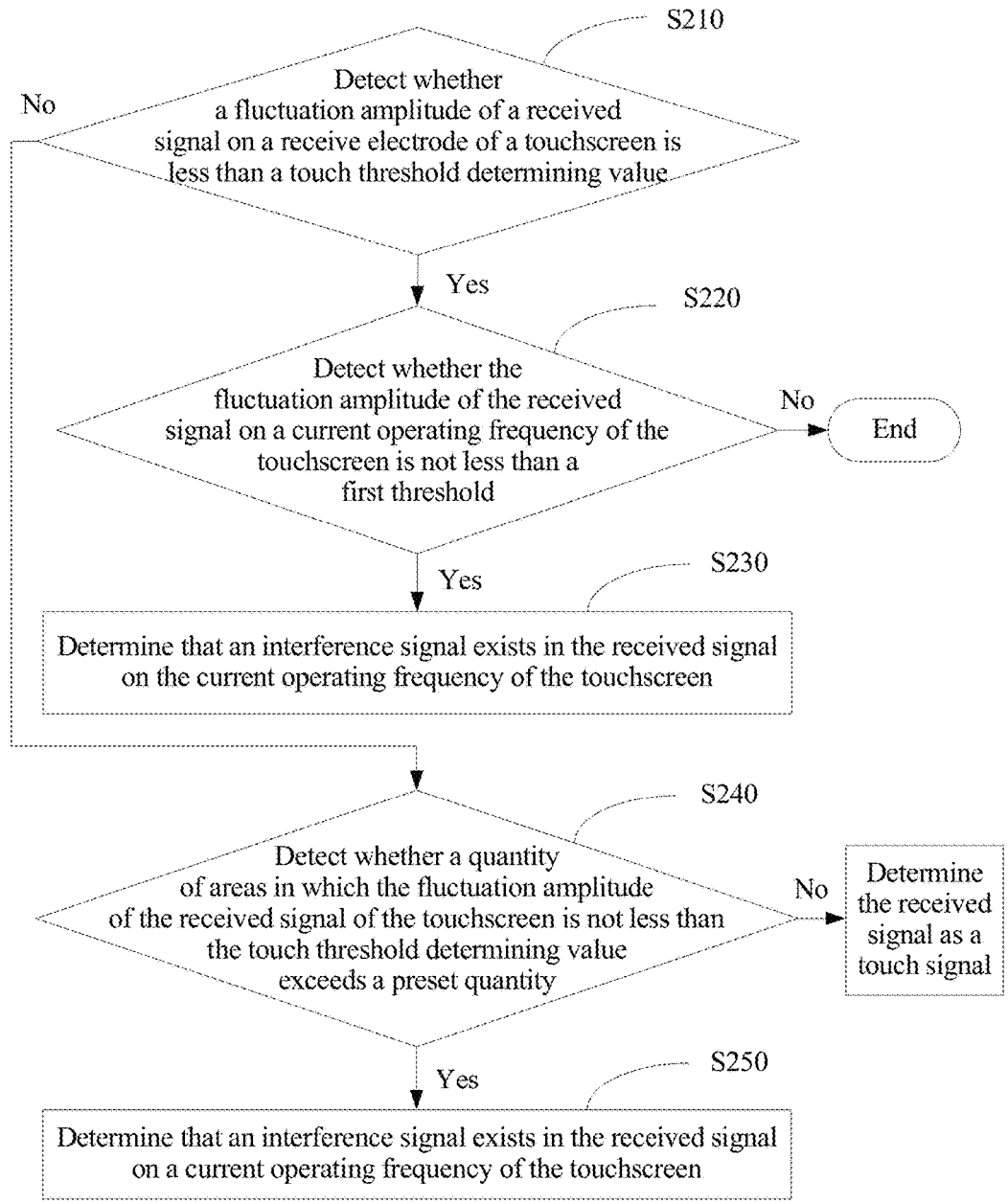
FIG. 10 is a schematic flowchart of detecting whether an interference signal exists in a touchscreen according to an embodiment of the present invention.

In an embodiment of the present invention, as shown in FIG. 10, a method for determining whether an interference signal exists in a received signal of the touchscreen may include the following steps.

S210. Detect whether a fluctuation amplitude of a received signal on a receive electrode of the touchscreen is less than a touch threshold determining value.

When it is detected that the fluctuation amplitude of the received signal is less than the touch threshold determining value, it is determined that the touchscreen is in an untouched state. In step S220, detect whether the fluctuation amplitude of the received signal on a current operating frequency of the touchscreen is not less than a first threshold. The first threshold is less than the touch threshold determining value.

When it is detected that the fluctuation amplitude of the received signal is less than the first threshold, it is determined that the interference signal does not exist in the received signal of the touchscreen, and the process ends.

When it is detected that the fluctuation amplitude of the received signal is not less than the first threshold, in step S230, determine that the interference signal exists in the received signal on the receive electrode on the current operating frequency of the touchscreen.

Optionally, when it is detected that the interference signal exists in the received signal on the current operating frequency of the touchscreen, alternatively, the method of step S220 may be used to detect whether the interference signal exists in the received signal on a next preset operating frequency of the touchscreen.

Optionally, when a fluctuation amplitude of the received signal is not less than the touch threshold determining value, the received signal may be a touch signal generated when a touch body normally touches the touchscreen, or may be an interference signal. In this case, whether the received signal is the interference signal is determined by detecting whether a quantity of areas, on the touchscreen, in which the fluctuation amplitude of the received signal is not less than the touch threshold determining value exceeds a preset quantity.

When it is detected that the fluctuation amplitude of the received signal is not less than the touch threshold determining value in step S210 shown in FIG. 10, in step S240, detect whether the quantity of areas, on the touchscreen, in which the fluctuation amplitude of the received signal is not less than the touch threshold determining value exceeds the preset quantity. The preset quantity may be freely set according to a specific application scenario, for example, may be set to 5.

When the quantity of areas in which the fluctuation amplitude of the received signal of the touchscreen is not less than the touch threshold determining value exceeds the preset quantity, in step S250, determine that the interference signal exists in the received signal on the current operating frequency of the touchscreen.

For example, the quantity of areas in which the fluctuation amplitude of the received signal of the touchscreen is not less than the touch threshold determining value is 6, and the preset quantity is 5. In this case, it may be determined that the interference signal exists in the received signal on the current operating frequency of the touchscreen.

When the quantity of areas in which the fluctuation amplitude of the received signal of the touchscreen is not less than the touch threshold determining value does not exceed the preset quantity, the received signal is determined as a touch signal.

Corresponding to the foregoing touchscreen interference suppression method, the present invention further provides an embodiment of a touchscreen interference suppression apparatus.

Figure 11:
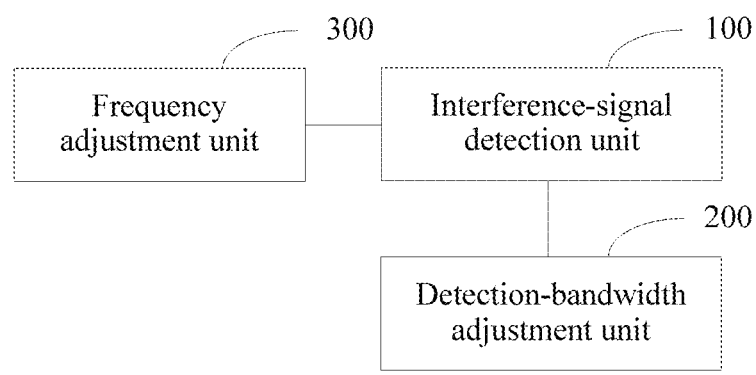
FIG. 11 is a schematic structural diagram of a touchscreen interference suppression apparatus according to an embodiment of the present invention.

As shown in FIG. 11, the touchscreen interference suppression apparatus provided in this embodiment of the present invention includes an interference-signal detection unit 100 and a detection-bandwidth adjustment unit 200.

The interference-signal detection unit 100 is configured to, when a touchscreen is in an untouched state, detect whether a wideband interference signal exists in a received signal on a receive electrode of the touchscreen.

A detection-bandwidth adjustment unit 200 is configured to, when the wideband interference signal exists in the received signal on the receive electrode, reduce a detection bandwidth of a band-pass filter of the touchscreen from a first detection bandwidth to a second detection bandwidth.

In an embodiment of the present invention, the interference-signal detection unit 100 may include a first interference-signal detection unit, a second interference-signal detection unit, and a first determining unit.

The first interference-signal detection unit is configured to: when the touchscreen is in the untouched state, detect whether an interference signal exists in the received signal on a current operating frequency of the touchscreen.

The second interference-signal detection unit is configured to: when it is detected that the interference signal exists in the received signal on the current operating frequency, detect whether the interference signal exists in the received signal on a next preset operating frequency of the touchscreen.

The first determining unit is configured to: when it is detected that the interference signal exists in the received signal on all preset operating frequencies of the touchscreen, determine that the wideband interference signal exists in the received signal on the receive electrode of the touchscreen.

In another embodiment of the present invention, the interference-signal detection unit 100 may further include a second determining unit, configured to: when it is detected that the interference signal exists in the received signal of some preset operating frequencies of the touchscreen, determine whether a narrowband interference signal exists in the received signal on the receive electrode.

Optionally, the touchscreen interference suppression apparatus shown in FIG. 11 may further include a frequency adjustment unit 300, configured to: when the interference-signal detection unit 100 detects that the narrowband interference signal exists in the received signal on the receive electrode, adjust the current operating frequency of the touchscreen to a preset operating frequency on which the interference signal does not exist.

According to the touchscreen interference suppression apparatus provided in this embodiment, when a touchscreen is in an untouched state, an interference-signal detection unit detects whether a wideband interference signal exists in a received signal on a current operating frequency of the touchscreen. When it is detected that the wideband interference signal exists, a detection bandwidth of a band-pass filter is reduced from a first detection bandwidth to a second detection bandwidth by using a detection-bandwidth adjustment unit. The wideband interference signal is filtered by using a smaller detection bandwidth, which reduces a captured signal-strength of the wideband interference signal, avoids false determining when determining is performed based on a touch threshold, and improves interference immunity of the touchscreen being in the untouched state. In addition, there is no need to increase the touch threshold determining value, which can ensure touch sensitivity of the touchscreen and can suppress the wideband suppression signal.

The first interference-signal detection unit in the foregoing embodiment may include a touchscreen status detection unit, an interference-signal detection subunit, and a first determining subunit.

The touchscreen status detection unit is configured to detect whether a fluctuation amplitude of the received signal on the receive electrode of the touchscreen is less than a touch threshold determining value.

The interference-signal detection subunit is configured to: when it is detected that the fluctuation amplitude of the received signal is less than the touch threshold determining value, detect whether the fluctuation amplitude of the received signal on the current operating frequency of the touchscreen is not less than a first threshold.

The first determining subunit is configured to: when it is detected that the fluctuation amplitude of the received signal is not less than the first threshold, determine that the interference signal exists at the current operating frequency.

In another embodiment of the present invention, the first interference-signal detection unit may include a touchscreen status detection unit, a first judging unit, and a second determining subunit.

The touchscreen status detection unit is configured to detect whether a fluctuation amplitude of the received signal on the receive electrode of the touchscreen is less than a touch threshold determining value.

When the touchscreen status detection unit detects that the fluctuation amplitude of the received signal is not less than the touch threshold determining value, the first judging unit is configured to determine whether a quantity of areas, on the touchscreen, in which the fluctuation amplitude of the received signal is not less than the touch threshold determining value exceeds a preset quantity.

When the first judging unit determines that the quantity of areas, on the touchscreen, in which the fluctuation amplitude of the received signal is not less than the touch threshold determining value exceeds the preset quantity, the second determining subunit is configured to determine that the touchscreen is in the untouched state, and that the interference signal exists in the received signal.

An embodiment of the present invention further provides a computer-readable storage medium, where the computer-readable storage medium may be a computer-readable storage medium assembled in a terminal, or may be a computer-readable storage medium that stands alone and that is not assembled in a terminal. The computer-readable storage medium stores operation instructions, where the operation instructions are configured to enable a processor to perform the method processes provided by the embodiments corresponding to FIG. 2, FIG. 3, and FIG. 10.

A person skilled in the art may clearly understand that, the technologies in the embodiments of the present invention may be implemented by software in addition to necessary hardware. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method, comprising:
    detecting whether a wideband interference signal exists in a received signal on a receive electrode of a touchscreen, wherein the touchscreen is in an untouched state while detecting whether the wideband interference signal exists in the received signal;
    in response to detecting that the wideband interference signal exists in the received signal on the receive electrode, reducing a detection bandwidth of a band-pass filter from a first detection bandwidth to a second detection bandwidth, wherein the second detection bandwidth is determined according to a current operating frequency of the touchscreen and a frequency range of the detected wideband interference signal, and wherein the detection bandwidth of the band-pass filter is a bandwidth that the band-pass filter will allow to pass, and the band-pass filter is configured to filter out other signals having frequencies that are outside of the detection bandwidth of the band-pass filter; and
    determining whether a touch action exists in another received signal, wherein the another received signal has been filtered by the band-pass filter using the second detection bandwidth.

2. The method according to claim 1, wherein detecting whether the wideband interference signal exists in the received signal comprises:
    detecting whether an interference signal exists in the received signal on the current operating frequency of the touchscreen, wherein the touchscreen is in the untouched state during the detection of the interference signal in the received signal; and
    in response to detecting that the interference signal exists in the received signal on the current operating frequency, detecting whether the interference signal exists in the received signal on a next preset operating frequency of the touchscreen; and
    in response to detecting that the interference signal exists in the received signal on all preset operating frequencies of the touchscreen, determining that the wideband interference signal exists in the received signal on the receive electrode of the touchscreen.

3. The method according to claim 2, further comprising:
    in response to detecting that the interference signal exists in the received signal on some preset operating frequencies of the touchscreen, determining that a narrowband interference signal exists in the received signal on the receive electrode; and adjusting the current operating frequency of the touchscreen to a preset operating frequency on which the interference signal does not exist.

4. The method according to claim 3, further comprising:
after adjusting the current operating frequency of the touchscreen to the preset operating frequency on which the interference signal does not exist, setting the detection bandwidth of the band-pass filter to the first detection bandwidth.

5. The method according to claim 2, wherein detecting whether the interference signal exists in the received signal on the current operating frequency of the touchscreen comprises:
detecting whether a fluctuation amplitude of the received signal on the receive electrode of the touchscreen is less than a touch threshold determining value;
in response to detecting that the fluctuation amplitude of the received signal is less than the touch threshold determining value, determining that the touchscreen is in the untouched state;
detecting whether the fluctuation amplitude of the received signal on the receive electrode on the current operating frequency of the touchscreen is not less than a first threshold; and
in response to detecting that the fluctuation amplitude of the received signal is not less than the first threshold, determining that the interference signal exists in the received signal on the receive electrode on the current operating frequency of the touchscreen.

6. The method according to claim 2, wherein detecting whether the interference signal exists in the received signal on the current operating frequency of the touchscreen comprises:
detecting whether a fluctuation amplitude of the received signal on the receive electrode on the current operating frequency of the touchscreen is less than a touch threshold determining value;
in response to detecting that the fluctuation amplitude of the received signal is not less than the touch threshold determining value, determining whether a quantity of areas, on the touchscreen, in which the fluctuation amplitude of the received signal is not less than the touch threshold determining value exceeds a preset quantity; and
in response to the quantity of areas, on the touchscreen, in which the fluctuation amplitude of the received signal is not less than the touch threshold determining value exceeding the preset quantity, determining that the interference signal exists in the received signal.

7. The method according to claim 2, further comprising:
in response to detecting that the interference signal exists in the received signal on all preset operating frequencies of the touchscreen, adjusting the current operating frequency of the touchscreen to a preset operating frequency on which the interference signal is weakest.

8. The method according to claim 2, further comprising:
in response to detecting that the interference signal does not exist in the received signal on the current operating frequency, setting the detection bandwidth of the band-pass filter to the first detection bandwidth.

9. The method according to claim 2, further comprising:
in response to detecting that the interference signal does not exist in the received signal on the next preset operating frequency of the touchscreen:
adjusting the current operating frequency of the touchscreen to the next preset operating frequency of the touchscreen; and
setting the detection bandwidth of the band-pass filter to the first detection bandwidth.

10. The method according to claim 1, wherein reducing the detection bandwidth of the band-pass filter comprises adjusting the detection bandwidth of the band-pass filter using a linear time-invariant system and a variable bandwidth frequency characteristic.

11. A terminal device, comprising:
a touchscreen;
a pulse generation circuit;
an amplifier;
an analog-to-digital converter; and
a processor;
wherein an output end of the pulse generation circuit is connected to a drive electrode of the touchscreen, an input end of the amplifier is connected to a receive electrode of the touchscreen, an input end of the analog-to-digital converter is connected to an output end of the amplifier, and an output end of the analog-to-digital converter is connected to the processor;
wherein the pulse generation circuit is configured to generate a pulse signal required for the touchscreen to operate, and send out the pulse signal by using the drive electrode of the touchscreen;
wherein the receive electrode of the touchscreen is configured to receive a received signal, the received signal comprising the pulse signal;
wherein the amplifier is configured to amplify the received signal;
wherein the analog-to-digital converter is configured to perform analog-to-digital conversion on the received signal; and
wherein the processor is configured to:
detect whether a wideband interference signal exists in the received signal on the receive electrode, wherein the touchscreen is in an untouched state while detecting whether the wideband interference signal exists in the received signal;
in response to detecting that the wideband interference signal exists in the received signal on the receive electrode, reduce a detection bandwidth of a band-pass filter from a first detection bandwidth to a second detection bandwidth, wherein the second detection bandwidth is determined according to a current operating frequency of the touchscreen and a frequency range of the detected wideband interference signal, and wherein the detection bandwidth of the band-pass filter is a bandwidth that the band-pass filter will allow to pass, and the band-pass filter is configured to filter out other signals having frequencies that are outside of the detection bandwidth of the band-pass filter; and
determine whether a touch action exists in another received signal, wherein the another received signal has been filtered by the band-pass filter using the second detection bandwidth.

12. The terminal device according to claim 11, wherein the pulse generation circuit, the amplifier, the analog-to-digital converter, and the processor are integrated in one chip.

13. The terminal device according to claim 11, wherein the processor is a central processing unit (CPU) or a controller.

14. The terminal device according to claim 11, wherein the processor is further configured to:
detect whether an interference signal exists in the received signal on the current operating frequency of the touchscreen, wherein the touchscreen is in the untouched state while detecting whether the interference signal exists in the received signal;

in response to detecting that the interference signal exists in the received signal on the current operating frequency, detect whether the interference signal exists in the received signal on a next preset operating frequency of the touchscreen; and in response to detecting that the interference signal exists in the received signal on all preset operating frequencies of the touchscreen, determine that the wideband interference signal exists in the received signal on the receive electrode of the touchscreen.

15. The terminal device according to claim 14, wherein the processor is further configured to:

detect, at the current operating frequency of the touchscreen, whether a fluctuation amplitude of the received signal on the receive electrode of the touchscreen is less than a touch threshold determining value, wherein the touchscreen is in the untouched state while detecting whether the fluctuation amplitude of the received signal on the receive electrode of the touchscreen is less than the touch threshold determining value;

in response to detecting that the fluctuation amplitude of the received signal is not less than the touch threshold determining value, determine whether a quantity of areas, on the touchscreen, in which the fluctuation amplitude of the received signal is not less than the touch threshold determining value exceeds a preset quantity; and in response to the quantity of areas, on the touchscreen, in which the fluctuation amplitude of the received signal is not less than the touch threshold determining value exceeding the preset quantity, determine that the interference signal exists in the received signal.

16. The terminal device according to claim 14, wherein the processor is further configured to:

in response to detecting that the interference signal does not exist in the received signal on the current operating frequency, set the detection bandwidth of the band-pass filter to the first detection bandwidth.

17. The terminal device according to claim 14, wherein the processor is further configured to:

in response to detecting that the interference signal exists in the received signal on some preset operating frequencies of the touchscreen, determine that a narrowband interference signal exists in the received signal on the receive electrode; and adjust the current operating frequency of the touchscreen to a preset operating frequency on which the interference signal does not exist.

18. The terminal device according to claim 17, wherein the processor is further configured to:

after adjusting the current operating frequency of the touchscreen to the preset operating frequency on which the interference signal does not exist, set the detection bandwidth of the band-pass filter to the first detection bandwidth.

19. The terminal device according to claim 11, wherein the terminal device is a mobile phone with a touchscreen or a tablet.

20. A non-transitory computer-readable storage medium storing a program to be executed by a processor, the program including instructions for:

detecting whether a wideband interference signal exists in a received signal on a receive electrode of a touchscreen, wherein the touchscreen is in an untouched state while detecting whether the wideband interference signal exists in a received signal;

in response to detecting that the wideband interference signal exists in the received signal on the receive electrode, reducing a detection bandwidth of a band-pass filter from a first detection bandwidth to a second detection bandwidth, wherein the second detection bandwidth is determined according to a current operating frequency of the touchscreen and a frequency range of the detected wideband interference signal, wherein the detection bandwidth of the band-pass filter is a bandwidth that the band-pass filter will allow to pass, and the band-pass filter is configured to filter out other signals having frequencies that are outside of the detection bandwidth of the band-pass filter; and determining whether a touch action exists in another received signal, wherein the another received signal has been filtered by the band-pass filter using the second detection bandwidth.

21. The non-transitory computer-readable storage medium according to claim 20, wherein the program further includes instructions for:

detecting whether an interference signal exists in the received signal on the current operating frequency of the touchscreen, wherein the touchscreen is in the untouched state while detecting whether the interference signal exists in the received signal;

in response to detecting that the interference signal exists in the received signal on the current operating frequency, detecting whether the interference signal exists in the received signal on a next preset operating frequency of the touchscreen; and in response to detecting that the interference signal exists in the received signal on all preset operating frequencies of the touchscreen, determining that the wideband interference signal exists in the received signal on the receive electrode of the touchscreen.

* * * * *